US010062507B2

(12) United States Patent
Aotani et al.

(10) Patent No.: US 10,062,507 B2
(45) Date of Patent: Aug. 28, 2018

(54) ELECTRONIC DEVICE SHEET

(71) Applicant: TDK CORPORATION, Tokyo (JP)

(72) Inventors: Junji Aotani, Tokyo (JP); Shigeaki Tanaka, Tokyo (JP); Katsuyuki Kurachi, Tokyo (JP); Tatsuo Namikawa, Tokyo (JP); Yuuki Aburakawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 54 days.

(21) Appl. No.: 15/331,447

(22) Filed: Oct. 21, 2016

(65) Prior Publication Data

US 2017/0117096 A1    Apr. 27, 2017

(30) Foreign Application Priority Data

Sep. 2, 2015 (JP) .................. 2015-173100

(51) Int. Cl.
*H01G 4/30* (2006.01)
*H01G 4/06* (2006.01)

(52) U.S. Cl.
CPC .................... *H01G 4/06* (2013.01)

(58) Field of Classification Search
CPC ........................................ H01G 4/30
USPC ......................................... 361/313
See application file for complete search history.

(56) References Cited

U.S. PATENT DOCUMENTS 6,441,419 B1 * 8/2002 Johnson ............ H01L 21/76838
257/296
7,524,552 B2 * 4/2009 Yokota ...................... H01G 4/33
174/259

FOREIGN PATENT DOCUMENTS

JP    2014-165596 A    9/2014
WO   2014/077081 A1    5/2014

* cited by examiner

*Primary Examiner* — Eric Thomas
(74) *Attorney, Agent, or Firm* — Oliff PLC

(57) ABSTRACT

An electronic device sheet, comprising a pair of electrodes, a dielectric layer provided between the pair of electrodes, and one or more insulation patch members provided on one of principal surfaces of the dielectric layer, wherein the insulation patch member includes a boundary line having an undulating shape.

7 Claims, 3 Drawing Sheets

ELECTRONIC DEVICE SHEET

TECHNICAL FIELD

The present invention relates to an electronic device sheet.

BACKGROUND

In recent years, in various electronic devices, spaces for installing electronic components have tended to be reduced. Thus, an electronic device sheet including a capacitor has a demand for a reduction in profile. For the reduction of an electronic device sheet in profile, it is effective to reduce the thickness of a dielectric layer. As one of the techniques therefor, there is a known method of manufacturing an electronic device sheet of a capacitor or the like by forming a thin dielectric layer on an electrode layer using a thin film forming technology such as a sputtering method. However, thinning a dielectric layer tends to lead to reductions in withstanding voltage and leakage properties of the dielectric layer. For this reason, techniques for improving the withstanding voltage and the leakage properties in accordance with thinning a dielectric layer are under study. For example, Patent Literature 1 discloses a technique that optimizes a material, a crystalline structure, and an orientation with respect to the surface of a substrate, of a dielectric layer in an electronic device sheet, so as to improve the leakage properties and the withstanding voltage of the dielectric layer.

CITATION LIST

Patent Literature

[Patent Literature 1] Japanese Unexamined Patent Publication No. 2004-165596

SUMMARY

Technical Problem

By prior art represented by Patent Literature 1, a dielectric element is manufactured that is low in leakage current in a thin dielectric layer and high in withstanding voltage. However, a dielectric layer (dielectric material) of a capacitor has piezoelectric properties, and thus mechanical deformation due to an inverse piezoelectric effect repeatedly occurs in the dielectric layer through the use of an element. The present inventors found, through a long-term reliability test on a conventional electronic device sheet sample, that when a dielectric layer suffers mechanical deformation repeatedly for a long time, mechanical stress is accumulated in the dielectric layer, and this stress becomes a cause of dielectric breakdown of the dielectric layer in the long run.

The present invention is made in view of the above-described finding and has an objective to provide an electronic device sheet that suppresses dielectric breakdown due to a mechanical stress and has an excellent durability.

Solution to Problem

An electronic device sheet according to the present invention comprises a pair of electrodes, a dielectric layer provided between the pair of electrodes, and an insulation patch member provided on one of principal surfaces of the dielectric layer, the insulation patch member including a boundary line having an undulating shape.

It is preferable that projecting portions of the boundary line include regions residing outside an imaginary circle that is centered on the center of gravity of the insulation patch member and that has the same area as that of the insulation patch member, recessed portions of the boundary line include regions residing inside the imaginary circle, a ratio L/r between a radius r of the imaginary circle and a maximum distance L of distances from the center of the imaginary circle to the projecting portions is 1.02 to 1.4, and a ratio S/r between the radius r of the imaginary circle and a minimum distance S of distances from the center of the imaginary circle to the recessed portions is 0.6 to 0.98.

It is preferable that the dielectric layer includes a nucleus portion, and the nucleus portion is covered with the insulation patch member.

It is preferable that the insulation patch member includes two or more and 120 or less of the projecting portions and two or more and 120 or less of the recessed portion.

It is preferable that the electronic device sheet includes two or more of the insulation patch members on the principal surface, and a closest distance between the insulation patch members is 100 μm to 5 mm.

Advantageous Effect of Invention

The electronic device sheet according to the present invention suppresses dielectric breakdown due to a mechanical stress and has an excellent durability. Thus, the properties of the electronic device sheet can be maintained for a long time.

DETAILED DESCRIPTION

Embodiment

Hereafter, a preferred embodiment of the present invention will be described with reference to the drawings, but the present invention is not limited to the following embodiment. Note that identical or equivalent elements will be denoted by the same reference symbols and the description thereof will be omitted if it is redundant.

Figure 1:
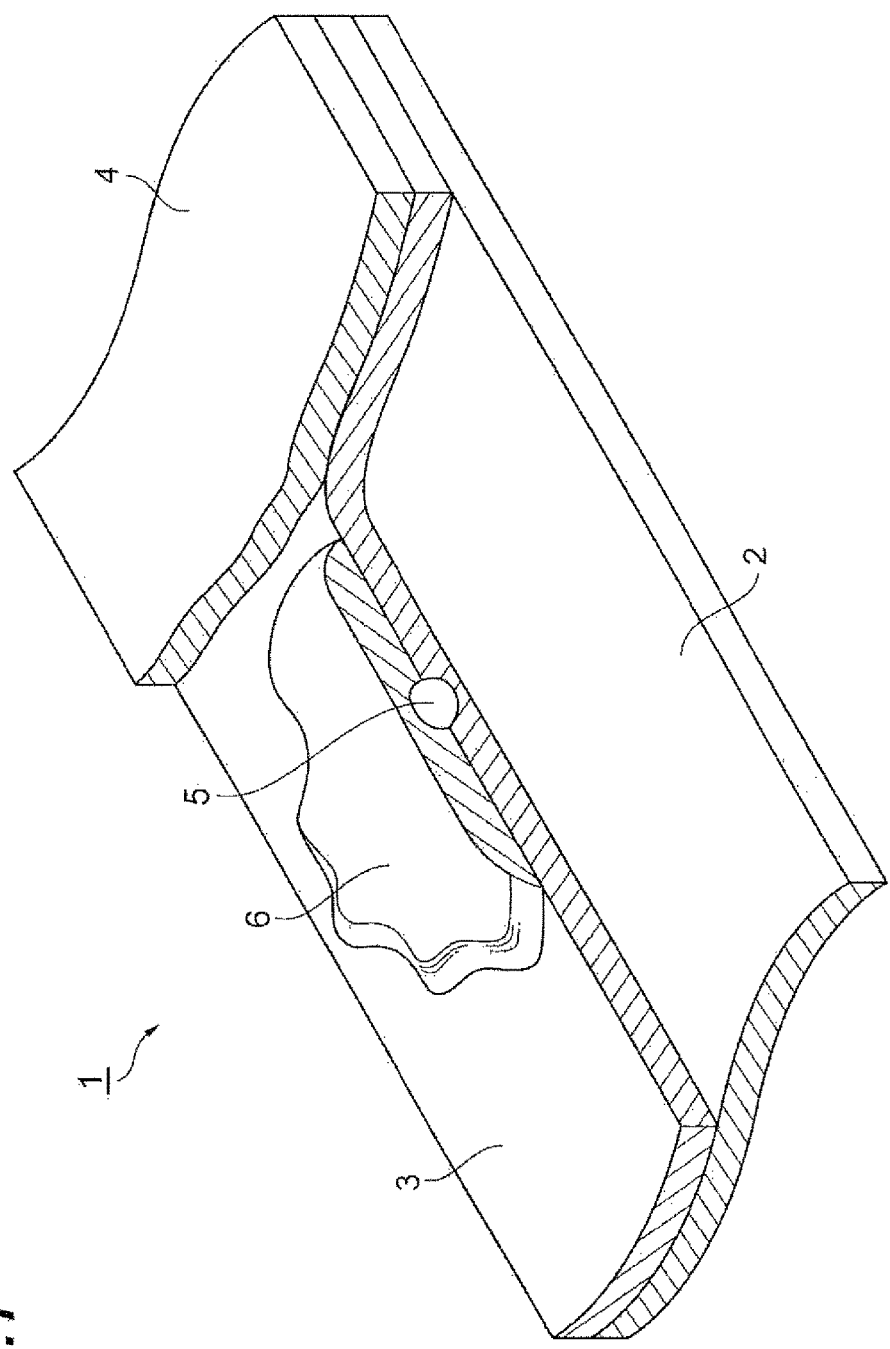
FIG. 1 is a perspective cross-sectional view schematically illustrating an electronic device sheet in an embodiment of the present invention.

FIG. 1 is a perspective cross-sectional view schematically illustrating an electronic device sheet in an embodiment of the present invention. An electronic device sheet 1 includes a lower part electrode layer 2, an upper part electrode layer 4, a dielectric layer 3 formed between the lower part electrode layer 2 and the upper part electrode layer 4, and a insulation patch member 6 provided on one of the principal surfaces of the dielectric layer 3. Hereafter, the lower part electrode layer 2 and the upper part electrode layer 4 will also be collectively referred to as a pair of electrode layers. Note that the terms "upper part" and "lower part" for the electrode layers merely denote relative-position relations with the dielectric layer 3 in a direction. Therefore, the present embodiment also includes a mode in which the upper part electrode layer 4 in the present embodiment is positioned at the lower part of an actual product, and the lower part electrode layer 2 in the present embodiment is positioned at the upper part of the actual product. In addition, the principal surfaces of the dielectric layer 3 refer to a pair of opposed surfaces having the largest area in the dielectric layer.

The electronic device sheet in the present embodiment includes a plurality of modes including a thin film capacitor, such as a sheet electronic device that is made into an inductor by patterning an upper part electrode layer or a lower part electrode layer of a thin film capacitor into a spiral shape, a sheet electronic device that is made into a resistance element by forming an upper part electrode layer or a lower part electrode layer of a thin film capacitor into a line shape, a sheet electronic device in which an upper part electrode layer or a lower part electrode layer of a thin film capacitor is made into a specific wiring shape, and a sheet electronic device that is made into an electronic band gap (EBG) element by patterning a dielectric film in a periodic manner.

The insulation patch member 6 can function as a central part to control (leak or adjust) a charge caused by stress accumulated in the dielectric layer 3. In the electronic device sheet, mechanical stress is accumulated in the dielectric layer 3 through use. Where stress is accumulated, a charge tends to be accumulated locally because structural strain develops in the dielectric layer 3. When the accumulated charge exceeds a retention limit to be rapidly released, dielectric breakdown may be brought about to the dielectric layer 3. Although the reason that the electronic device sheet 1 in the present embodiment suppresses dielectric breakdown due to a mechanical stress is not entirely explained clearly, the present inventors consider as follows. Ex-post charges accumulated in the dielectric layer 3 due to mechanical stresses are first concentrated on the insulation patch members 6. The charges concentrated on the insulation patch members 6 are propagated along the interface between the insulation patch member 6 and the dielectric layer 3 to be gradually released in the form of interfacial current reaching electrode layers. As seen from the above, it is considered that the accumulated charges are not released rapidly even when local accumulation of charges develops in the dielectric layer 3 due to mechanical stresses, which hardly causes dielectric breakdown to occur in the dielectric layer.

The insulation patch member 6 in the present embodiment includes a boundary line having an undulating shape. In the electronic device sheet having such a shape, dielectric breakdown due to concentration of charges caused by mechanical stress is suppressed as compared with a round-shape insulation patch member having the same area, and it is possible to maintain the properties of the insulation patch member for a long period. Regarding the reason for this, the present inventors have the following idea. That is, in the insulation patch member 6 in the present embodiment, charges caused by stress are selectively accumulated in an outer circumferential portion of the insulation patch member 6 as compared with the round-shape insulation patch member having the same area. Here, the expression "charges are selectively accumulated" refers to accumulation of charges in recessed portions (portions bending in a direction approaching a substantial center (the center of gravity) of the insulation patch member 6) and projecting portions (portions bending in a direction separating from the center (the center of gravity) of the insulation patch member 6) of the undulating-shaped boundary line of the insulation patch member 6. As a result, the accumulated charges are gradually discharged from projecting and recessed portions of the boundary line of the insulation patch member 6. It is considered that this suppresses the occurrence of dielectric breakdown due to a number of charges locally accumulated and released at a time in the insulation patch member 6. In addition, the insulation patch member 6 in the present embodiment includes the undulating-shaped boundary line, which improves the adhesiveness of edge portions of the insulation patch member 6, mitigating the risk that the insulation patch member 6 is detached or broken.

The insulation patch member 6 in the present embodiment includes a boundary line having an undulating shape, and the boundary line includes projecting portions projecting outward from the insulation patch member and recessed portions projecting inward from the insulation patch member. Examples of the shape of the boundary line of the insulation patch member 6 include, assuming an imaginary circle that is centered on the center of gravity of the insulation patch member 6 and that has the same area as that of the insulation patch member, a shape in which projecting portions of the boundary line include regions residing outside the imaginary circle, and recessed portions of the boundary line include regions residing inside the imaginary circle.

When the maximum distance of distances from the center of the imaginary circle to the projecting portions is denoted by L, and the radius of the imaginary circle is denoted by r, a ratio L/r is preferably 1.02 to 1.4. When the ratio L/r is 1.02 or more, charges accumulated in the insulation patch member 6 due to stress are hard to be accumulated uniformly in an outer circumferential portion, which makes large charges hard to be accumulated in the insulation patch member 6. For this reason, dielectric breakdown by large energy being emitted at a time can be ultimately suppressed. On the other hand, when the ratio L/r is 1.4 or less, projecting portions are not tapered too much, which makes accumulated charges due to stress hard to be concentrated in a tip portion of a projecting portion. For this reason, dielectric breakdown due to inducing the release of localized energy can be suppressed.

When the minimum distance of distances from the center of the imaginary circle to the recessed portions is denoted by S, a ratio S/r of S to the radius of the imaginary circle is preferably 0.6 to 0.98. Here, S refers to the shortest distance of the distances between the boundary line and the center of the imaginary circle in a region of a recessed portion residing inside the imaginary circle. When the ratio S/r is 0.6 or more, recessed portions are not tapered too much, which makes accumulated charges due to stress hard to be concentrated in a tip portion of a projecting portion. For this reason, dielectric breakdown due to inducing the release of localized energy can be suppressed. When the ratio S/r is 0.98 or less, charges accumulated in the insulation patch member 6 due to stress are hard to be accumulated uniformly in an outer circumferential portion, which makes large charges hard to be accumulated in the insulation patch member 6. For this reason, dielectric breakdown by large energy being emitted at a time can be ultimately suppressed.

The area of the insulation patch member 6 is preferably 50 $\mu m^2$ or larger and 10000 $\mu m^2$ or smaller. Here, the area of the insulation patch member 6 refers to the area of a plane figure made by projecting the insulation patch member 6 onto a plane parallel to the dielectric layer 3. Examples of a method of measuring the area of the insulation patch member 6 include one that performs image recognition on contrast differences in an enlarged photograph under a scanning electron microscope (SEM) with software and calculates the area of the portion inside the contour of the insulation patch member 6. The center of gravity can be determined by a well-known method for calculating the center of gravity based on a planar image of an insulation patch member obtained by the SEM. Examples of such a method include a method in which, with an X axis and a Y axis to be references provided in the obtained image, regarding the number of bright points in the image that is binarized to be a mass, a point at which first order moments in the planar image balance out is calculated.

In the dielectric layer 3, a nucleus portion 5 may exist. It is preferable that the nucleus portion 5 be covered with the insulation patch member 6. The nucleus portion 5 is constituted by, for example, a recessed portion or a projecting portion on the surface of the dielectric layer 3, a hole penetrating the dielectric layer 3, or the like. The shape of the above recessed portion or the hole in the dielectric layer surface is not limited in particular, and the shape may be linear, round shape, island shape, or the other shapes. The projecting portion may be a protuberance portion of the dielectric layer 3 itself, and the protuberance portion may be formed by other dielectric particles embedded in the dielectric layer 3. A crack is classified as a recessed portion when not penetrating the dielectric layer 3, or classified as a hole when penetrating the dielectric layer 3. When the nucleus portion 5 is covered with the insulation patch member 6, the insulation patch member 6 is fixed by the dielectric layer more stably, which enables more stable emission of a concentrated charge, resulting in an improved durability. In addition, in the case of forming the insulation patch member 6 in an electrophoresis manner, the above nucleus portion 5 can serve as the start point of forming the insulation patch member 6 or means for retaining the insulation patch member 6.

The numbers of the recessed portions and the projecting portions can be two or more and 120 or less, respectively. When both numbers are two or more, charges due to stress are prone to be concentrated extremely in a recessed portion or a projecting portion in an insulation patch member. For this reason, induction of a rapid release of concentrated charges and resulting dielectric breakdown can be suppressed. In addition, when both numbers are 100 or less, the vicinity of an inflection point between a recessed portion and a projecting portion is hard to be steep. For this reason, emission of charges accumulated in a tip portion of the insulation patch member 6 due to stress at a time and resulting dielectric breakdown can be suppressed.

In the case where the electronic device sheet 1 includes two or more insulation patch members 6 on the principal surface of the dielectric layer 3, a closest distance between the insulation patch members can be set at 100 μm or longer and 5 mm and shorter. Here, the term "closest distance" herein refers to the shortest distance between the boundary lines of two insulation patch members. In addition, in the case where the electronic device sheet 1 includes three or more insulation patch members 6 on the principal surface of the dielectric layer 3, the term "closest distance" refers to the closest distance between two insulation patch members that have the shortest closest distance. When the closest distance falls within the range of the numeric value, collaborative charge elimination between insulation patch members is enabled, further enhancing the durability of the electronic device sheet 1. When the closest distance is shorter than 100 μm, there is the risk that charges due to mechanical stress are concentrated extremely on a plurality of insulation patch members 6. In addition, when the closest distance is longer than 5 mm, the distance between the nearest insulation patch members 6 are too long, which may make it difficult for a plurality of insulation patch members to perform collaborative action. Here, the term "collaborative action among insulation patches" refers to action in which, when a plurality of insulation patches are adjacent to one another, charges accumulated in an insulation patch are propagated to other insulation patches, so as to release the charges without breaking the dielectric layer.

As the material of the lower part electrode layer 2 in the present embodiment, well-known conductive materials can be selected as appropriate. The well-known conductive materials refer to, for example, metals, metallic oxides, conductive organic materials, and the like. In particular, the lower part electrode layer 2 desirably has a low electric resistance and a high mechanical strength, and thus metallic materials can also be used therefor. Above all, Ni and Cu are preferable because they have low electric resistances and are relatively sturdy metallic materials. In particular, in terms of the viewpoint of high-temperature load reliability and moisture-proof load reliability, the material of the lower part electrode layer 2 may be a conductive body containing at least Ni. Examples of the conductive body containing Ni include a pure Ni (99.9% or more of Ni) or a Ni-based alloy. The Ni-based alloy may contain, for example, a noble metal element such as Pt, Pd, Ir, Ru, and Rh, and the content of the noble metal element can be set at 50 mass % or less with respect to the entire mass of the alloy. Within such a range of content, the high-temperature load reliability and the moisture-proof load reliability of the electronic device sheet 1 equivalent to the case of using a pure Ni tends to be obtained.

The mode of the lower part electrode layer 2 in the present embodiment can be selected from various modes including a conductive foil containing a metal, a sintered body containing a metal, an electrode substrate in which a conductive thin film of any kind is formed on the substrate, and the like. The lower part electrode layer 2 may be a Ni metallic foil consisting of a metal polycrystal in particular. By making the lower part electrode layer 2 into the metallic foil, it is possible to reduce the difference in thermal expansion coefficient from the dielectric layer 3 and to suppress a reduction in capacitance of the electronic device sheet 1. It is desirable that as the substrate of the electrode substrate, a material of a thermal expansion coefficient having a small difference from that of the dielectric layer 3 be selected, and examples of the substrate include a Si substrate and a ceramic substrate (not illustrated). Examples of the conductive thin film include a Ni thin film formed by sputtering, vapor deposition, or the like. As the electrode substrate, for example, a Si substrate with a Ni thin film, a ceramic substrate with a Ni thin film, or the like can be used. It is thereby possible to suppress a reduction in capacitance of the electronic device sheet 1 due to the difference in thermal expansion coefficient between the lower part electrode layer 2 and the dielectric layer 3.

Furthermore, the mode of the lower part electrode layer 2 in the present embodiment may be a mode in which a different conductive material is interposed between the lower part electrode layer 2 and the dielectric layer 3. Alternatively, the lower part electrode layer 2 may have a multi-layered electrode structure. The multi-layered electrode structure can be a multi-layered electrode in which Ni electrode layers are disposed on the side of a surface contacting the dielectric layer 3. Such a multi-layered electrode may have, for example, a structure in which Ni electrode layers are formed and laminated on a Cu metallic foil by sputtering, vapor deposition, or the like. In the case where a Ni electrode layer is in contact with the dielectric layer 3, the high-temperature load reliability and the moisture-proof load reliability of the electronic device sheet 1 are enhanced.

The material of the dielectric layer 3 in the present embodiment can be a perovskite oxide dielectric, which has a high relative permittivity. Of perovskite dielectrics, a $BaTiO_3$-based dielectric without lead (Pb) is preferable in terms of environmental preservation viewpoint. In the case of a $BaTiO_3$-based dielectric, a $BaTiO_3$-based dielectric in which a part of a Ba site is substituted with an alkaline earth such as Ca and Sr may be used. In addition, a $BaTiO_3$-based dielectric in which a part of Ti site is substituted with an element such as Zr, Sn, and Hf may be used. Furthermore, a rare-earth element, or Mn, V, Nb, Ta, or the like may be added to the perovskite oxide dielectric.

As a method of forming the dielectric layer 3 in the present embodiment, a method normally used to form a thin film can be used. Examples of such a method include the application of a solution by metal organic decomposition (MOD) or the like, sputtering, vapor deposition, pulse laser deposition (PLD), chemical vapor deposition (CVD), or the like.

The structure of the dielectric layer 3 in the present embodiment can be a thin film having a film thickness of 1000 nm or less. A dielectric layer 3 having a film thickness of 1000 nm or less allows the suppression of a reduction in capacitance value per unit area, which is preferable. In addition, the lower limit of the film thickness is not limited in particular, but it is preferable that the lower limit be 50 nm or more from the viewpoint of keeping the insulation resistance value of the dielectric layer 3 high. In view of the above relationship between the insulation resistance value and the capacitance, it is considered that a preferable range of the film thickness of the dielectric layer 3 in the electronic device sheet 1 is from 250 nm to 1000 nm. In addition, the crystalline structure of the dielectric layer 3 can be polycrystal.

The nucleus portion 5 in the present embodiment may be formed by irradiating the dielectric layer 3 after deposition with an electromagnetic wave such as a laser beam. Alternatively, the nucleus portion 5 may be physically formed by the collision of hard ceramic powder or the like. The nucleus portion 5 may be formed by causing particles to be adhered to a charged region of the dielectric layer 3. For example, the nucleus portion 5 may be formed by bringing the particles and a sample on which the dielectric layer 3 is formed in a proper container and into contact with each other. This contact may be performed in a gas flux in which the particles are sprayed and caused to flow in a gas, or may be performed in a cistern in which the particles are dispersed in pure water or an organic solvent. In addition, the particles may be retained during the deposition process of the dielectric layer 3 and adhered to the dielectric layer 3.

In the present embodiment, the insulation patch members 6 are formed after the dielectric layer 3 is formed. Before the formation of the insulation patch members 6, surface treatment, physical cleaning, or the like may be performed on the surface of the dielectric layer 3. Examples of the surface treatment include etching using an acid or an alkali, etching using plasma, and the like. Examples of the physical cleaning include ultrasonic cleaning, polishing, and the like. Through these processes, the state of the interface between the dielectric layer 3 and the insulation patch member 6 is made preferable, which stabilizes electric properties for a longer time.

Figure 2:
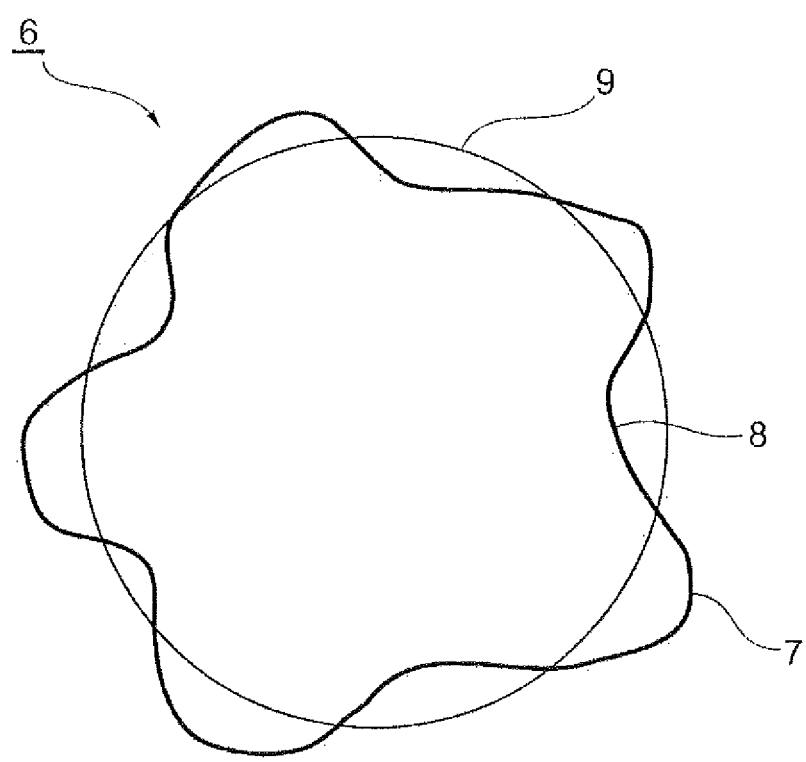
FIG. 2 is a schematic diagram illustrating a planar shape of an insulation patch member in the embodiment according to the present invention.

FIG. 2 is a schematic diagram illustrating a planar shape of an insulation patch member 6 according to the present embodiment. In the insulation patch member 6 in this schematic diagram, projecting portions 7 and recessed portions 8 are present alternately with respect to an imaginary circle 9.

The material of the insulation patch member 6 in the present embodiment is not limited in particular as long as the material is an insulator, and may be any of organic materials and inorganic materials. One of these materials may be used alone, or two or more kinds of these materials may be used in combination. Examples of the organic materials include an acrylic resin, an epoxy resin, a fluororesin, a urethane resin, an amide resin, a phenolic resin, polyetheretherketone (PEEK) resin, polycarbonate resin, polybutadiene resin, polyimide resin, and the like. Examples of the inorganic materials include alumina, a silicon oxide, a barium titanate, a strontium titanate, a calcium titanate, and the like.

As an example of a method of forming the insulation patch members 6, a method of forming insulation patch members 6 containing inorganic ceramic particles will be described below specifically. In this example, a dispersion liquid in which the inorganic ceramic fine particles are dispersed in an organic solvent is used as a discharging solution. As the inorganic ceramic, alumina, a silicon oxide, a barium titanate, a strontium titanate, a calcium titanate, or the like is used. The particle size of inorganic ceramic fine particles may be set, for example, within a range of 3 nm to 20 nm. In addition, the content of the inorganic ceramic fine particles in the discharging solution may be set, for example, within a range of 0.1 mass % or more and 30 mass % or less. Examples of the organic solvent include xylene, isopropyl alcohol, acetone, and the like. The discharging solution may be a high-viscosity dispersion liquid with a suitable resin material added thereto so as to facilitate discharging in a discharging device. Examples of the resin material include high-resistance resin materials such as an acrylic resin, an epoxy resin, a fluororesin, a urethane resin, an amide resin, a phenolic resin, a polyetheretherketone (PEEK) resin, a polycarbonate resin, a polybutadiene resin, and a polyimide resin. From a coating of such a high-viscosity dispersion liquid, it is possible to form the insulation patch member 6 containing a resin and dielectric ceramic particles dispersed in the resin.

Besides the adjustment of the content of the inorganic ceramic fine particles in a dispersion liquid as described above, a proper amount of dispersant may be added to the dispersion liquid. As such a dispersant, a well-known surfactant can be used as appropriate. In particular, alkyl glucoside, polyethylene glycol, and fatty acid sodium, which are surfactants, can be used. Alternatively, a monomer of dielectric ceramic fine particles may be dispersed by ultrasonic agitation.

Figure 3:
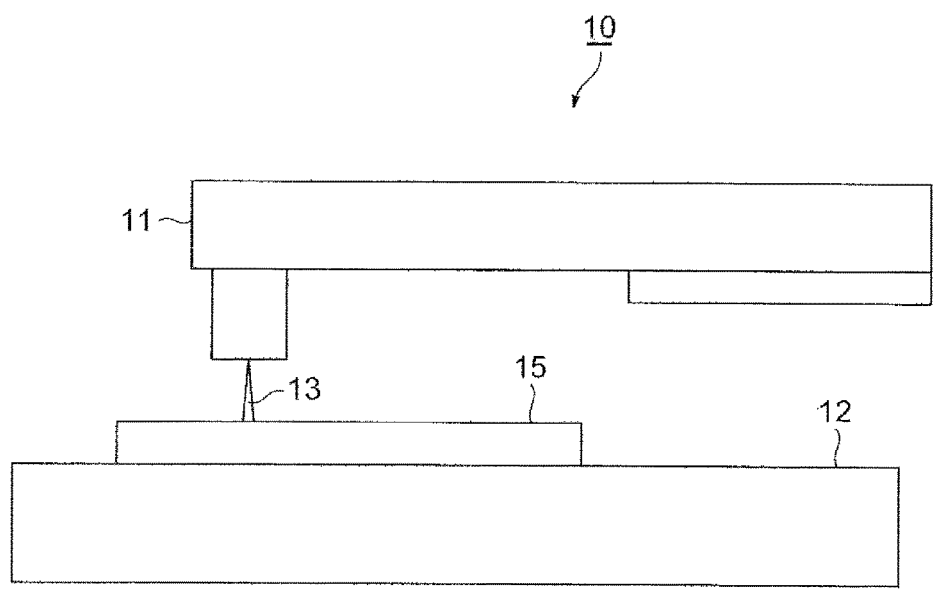
FIG. 3 is a schematic diagram of a discharging device in the embodiment according to the present invention.

As an example of a method of forming the insulation patch members 6 in the present embodiment, a method using a discharging device is cited. FIG. 3 is a schematic diagram illustrating an example of a discharging device in the present embodiment. As illustrated in FIG. 3, a discharging device 10 includes a stage 12, a laminated body 15 placed on the stage 12, a spraying unit 11 configured to discharge discharging solution 13 to form the insulation patch members 6 on the laminated body 15. The laminated body 15 is made by forming the dielectric layer 3 on the lower part electrode layer 2 previously described.

With the discharging device 10, the discharging solution 13 is discharged from the spraying unit 11 onto the principal surface of the dielectric layer 3 in the laminated body 15 placed on the stage 12. In the case where the nucleus portion 5 exists on the principal surface of the dielectric layer 3, it is preferable to discharge the discharging solution aiming at the nucleus portion 5.

In the discharging device, a small quantity of high-viscosity dispersion liquid containing inorganic ceramic particles is discharged in spray to be adhered, from the spraying unit 11, to a nucleus portion or a predetermined center and the periphery thereof in the dielectric layer 3 of the laminated body 15 placed on the stage 12. Therefore, the spraying unit 11 includes a nozzle to spray the high-viscosity dispersion liquid to the dielectric layer 3 in the form of fine droplets. This nozzle may be a nozzle having a simple circular cross section or rectangular cross section, or may be a nozzle of a coaxial type such that recessed portions and projecting portions can be formed with a primary circle and secondary circles, as will be described later. Alternatively, a structure in which a plurality of nozzles of such a kind are bundled may be employed. For example, a structure in which a plurality of nozzles are bundled in a linear or planar manner, as is used in what is called an inkjet printer, can be used.

A specific method of manufacturing projecting portions and recessed portions is to open a nucleus portion or a predetermined center of the dielectric layer 3 using a metal mask stencil or a resist mask and cover an unnecessary portion, and to discharge the high-viscosity dispersion liquid thereto, so as to form the projecting portions and the recessed portions. Alternatively, without using such a mask, it is possible to form recessed portions and projecting portions only by discharging from a nozzle. Examples of such a method include a method in which, using the previously described coaxial mask, discharging is performed so that a difference is generated between a liquid current (a discharging speed or pressure, or a liquid concentration) on a central axis and a liquid current on an outer circumference side. For example, discharge is performed in the vicinity of the center for a portion to be a primary circle, while discharge is performed in the vicinity of the circumference of the primary circle for a plurality of secondary circles having a diameter of 0.1 to 0.3 with respect to the diameter of the primary circle. By removing solvent after the discharging, the primary circle and the secondary circles are integrated to form an insulation patch member, in which the circumference of the primary circle will serve as the recessed portions, and outside portions of the secondary circles with respect to the primary circle will serve as the projecting portions.

By performing heat treatment on the discharging solution adhered to the principal surface of the dielectric layer 3, it is possible to remove the solvent and crystallize inorganic ceramic fine particles, so as to form the insulation patch members 6. The crystallization may be performed by subjecting the adhered discharging solution to calcination treatment at a temperature of 500° C. or higher. It is thereby also possible to increase the relative permittivity of the insulation patch members 6. The crystalline state of the insulation patch members 6 can be confirmed through observation under a TEM, or cross section observation using a FIB-SIM. The measurement of the electric properties of the insulation patch members 6 can be performed through image recognition using a conductive atomic force microscope (AFM) with a microprobe.

The insulation patch members 6 can be formed by a mask sputtering method. In the mask sputtering method, using a mask provided at certain portions with fine openings, sputtering deposition is performed on an insulator as a target. In the case where the nucleus portion 5 exists on one of the principal surfaces of the dielectric layer 3, the insulation patch member 6 can be formed on the nucleus portion 5 by identifying a position using an image recognition device and performing sputtering thereon.

In the electronic device sheet 1 in the present embodiment, the upper part electrode layer 4 is formed after the insulation patch member 6 is formed. As the material of the upper part electrode layer 4 in the present embodiment, well-known conductive materials can be selected as appropriate. The well-known conductive materials refer to, for example, metals, metallic oxides, conductive organic materials, and the like, from which the conductive materials can be selected as appropriate. In particular, the upper part electrode layer 4 can have a low electric resistance and a high mechanical strength. For this reason, it is possible to use metals. Above all, Ni and Cu are preferable because they have low electric resistances and are relatively sturdy metallic materials. The upper part electrode layer 4 may be a single layer consisting of a Ni electrode layer or a Cu electrode layer, and may be a double-layer structure consisting of a Ni electrode layer and a Cu electrode layer. Between the upper part electrode layer 4 and the dielectric layer 3 or the insulation patch member 6, a different conductive material may be interposed. In the case where the upper part electrode layer 4 includes a Ni electrode layer, the Ni electrode layer side of the upper part electrode layer 4 can be brought into contact with the dielectric layer 3. In the case of using a Ni electrode layer for the whole or a part of the upper part electrode layer 4, a pure Ni or a Ni-based alloy can be used as with the lower part electrode layer 2. In the case of the Ni-based alloy, it is desirable that the alloy contain, for example, a noble metal element such as Pt, Pd, Ir, Ru, and Rh, and the content of the noble metal element be set at 50 mass % or less with respect to the entire mass of the alloy. Furthermore, it is preferable that the thickness of the upper part electrode layer 4 be within a range from 0.1 μm and 2.0 μm.

On the Ni electrode layer in the present embodiment, a Cu electrode layer may be formed. The Cu electrode layer herein can be a pure Cu (99.9% or more of Cu), or a Cu-based alloy. In the case of the alloy, the alloy may contain, for example, a noble metal element such as Pt, Pd, Ir, Ru, and Rh, and the content of the noble metal element may be set at 50 mass % or less with respect to the entire mass of the alloy. Cu has a feature that it has a resistivity equivalent to those of Au and Ag and is convenient for industrial use. For this reason, Cu is used for wirings in electronic devices in many cases. Using Cu for the upper part electrode layer 4 of the electronic device sheet 1 has an effect of reducing an equivalent series resistance (ESR) because of its relatively small resistivity.

The upper part electrode layer 4 can be formed by a method normally used to form a thin film. As such a method, for example, the application of a solution, sputtering, vapor deposition, PLD, CVD, or the like can be used as appropriate.

EXAMPLES

Hereinafter, the present invention will be specifically described by way of Examples. Note that the present invention is not limited to the following Examples.

Example 1

A dielectric layer ($BaTiO_3$-based dielectric) was formed by a sputtering method with a thickness of 800 nm on a Ni metallic foil having a size of 100 mm×100 mm. Annealing was thereafter performed on the Ni metallic foil on which the dielectric layer was deposited, so that the dielectric layer on the Ni metallic foil was crystallized, whereby a laminated body was obtained. As pretreatment to form insulation patch members, foreign objects and the like were removed from the dielectric layer of the laminated body by ultrasonic cleaning. Next, to form a nucleus portion on the dielectric layer, a dispersion liquid was prepared by dispersing the alumina particles having an average grain diameter of 0.25 µm in isopropyl alcohol (IPA). The dispersion liquid was discharged onto the dielectric layer by an inkjet method. The IPA was thereafter made evaporated, whereby the laminated body was obtained on the surface of the dielectric, the laminated body having a protruding portion made of the alumina particles (a recessed portion in the dielectric layer formed by collision with the alumina particles, as the nucleus portion).

Alumina was dispersed in xylene so that the concentration of the alumina was 30 mass %, whereby a dispersion liquid to form insulation patch members was prepared. Using a discharging device, the dispersion liquid was discharged in spray, targeting the nucleus portion 5 in the dielectric layer of the laminated body, so as to be adhered to the dielectric layer. The laminated body with the dispersion liquid adhered thereto was subjected to heat treatment 200° C. to be dried, whereby insulation patch members were formed on a principal surface of the dielectric layer. The insulation patch member had 20 projecting portions and 20 recessed portions on its boundary line, and the closest distance between insulation patch members was 150 µm. In addition, appearance check under a microscope showed that L/r was 1.03, and S/r was 0.97.

On the dielectric layer of the laminated body on which the insulation patch member was formed, a seed layer was formed by sputtering, and thereafter a Cu film was formed by electrolytic plating, whereby an upper part electrode layer (Cu electrode layer) was formed. Next, patterning was performed on the upper part electrode layer to form a capacitor element portion having a size of 10 mm×10 mm. Thereafter, for particle growth in the Cu electrode layer, annealing was performed on the laminated body on which the upper part electrode layer is formed, in vacuum at 340° C., whereby an electronic device sheet was obtained. The obtained electronic device sheet was divided into 100 electronic device sheet elements having a size of 10 mm×10 mm. A reliability test described below was conducted on the obtained electronic device sheet elements to evaluate the aged deterioration in capacitance value and insulation resistance value.

The reliability test was conducted in such a manner as to continuously apply a 5 VAC signal (1 kHz) to the 100 electronic device sheet elements enclosed in a hermetically-sealed atmospheric-pressure container maintained at a temperature of 85 degrees and a humidity of 85%, and measure the capacitance values and the insulation resistance values of the 100 electronic device sheet elements after 200 hours, 400 hours, and 600 hours. The capacitance values were measured at 1 kHz, 1 Vrms with an LCR Meter 4284A (Agilent Technologies) that was placed outside the hermetically-sealed atmospheric-pressure container. The insulation resistance values were measured under a condition of 4 VDC with a High-Resistance Meter 4339B (Agilent Technologies) that was placed outside the hermetically-sealed atmospheric-pressure container. The determination of aged deterioration was made by calculating a property preservation ratio from the number of electronic device sheet elements that satisfied reference values, a capacitance value of 2.5× $10^{-7}$ F or greater and an insulation resistance value of $5×10^{+8} \Omega$ or greater that were selected from among typical specifications of an electronic device sheet. As a result, in the present example, conforming items were obtained at 91% (91/100 pcs) after 600 hours. The results are shown in Table 1.

Example 2

An electronic device sheet element was manufactured by the same manufacturing method as in Example 1 except that the closest distance between insulation patch members was set at 500 µm. The measurement of the capacitance values and the insulation resistance values and the evaluation of aged deterioration were performed on the obtained electronic device sheet element under the same evaluation conditions as in Example 1. As a result, conforming items were obtained at 94% (94/100 pcs) after 600 hours.

Example 3

An electronic device sheet element was manufactured by the same manufacturing method as in Example 1 except that the closest distance between insulation patch members was set at 800 µm. The measurement of the capacitance values and the insulation resistance values and the evaluation of aged deterioration were performed on the obtained electronic device sheet element under the same evaluation conditions as in Example 1. As a result, conforming items were obtained at 95% (95/100 pcs) after 600 hours.

Example 4

An electronic device sheet element was manufactured by the same manufacturing method as in Example 1 except that the closest distance between insulation patch members was set at 1 mm. The measurement of the capacitance values and the insulation resistance values and the evaluation of aged deterioration were performed on the obtained electronic device sheet element under the same evaluation conditions as in Example 1. As a result, conforming items were obtained at 92% (92/100 pcs) after 600 hours.

Example 5

An electronic device sheet element was manufactured by the same manufacturing method as in Example 1 except that the closest distance between insulation patch members was set at 4 mm. The measurement of the capacitance values and the insulation resistance values and the evaluation of aged deterioration were performed on the obtained electronic device sheet element under the same evaluation conditions as in Example 1. As a result, conforming items were obtained at 98% (98/100 pcs) after 600 hours.

Example 6

An electronic device sheet element was manufactured by the same manufacturing method as in Example 1 except that an epoxy resin was used as the material of the insulation patch members, and a mask was formed by photoresist so that the clearance between one insulation patch member and another insulation patch member closest to the one insulation patch member was 6 mm, the number of projecting portions was 10, and the number of recessed portions was 10. The measurement of the capacitance values and the insulation resistance values and the evaluation of aged deterioration were performed on the obtained electronic device sheet element under the same evaluation conditions as in Example 1. The epoxy resin to be insulation patch members was applied by an inkjet method after the mask was formed, and the shape of the insulation patch members was obtained by lifting the mask off. As a result, conforming items were obtained at 87% (87/100 pcs) after 600 hours.

Example 7

An electronic device sheet element was manufactured by the same manufacturing method as in Example 6 except that the number of projecting portions was 30, and the number of recessed portions was 30, in an insulation patch member. The measurement of the capacitance values and the insulation resistance values and the evaluation of aged deterioration were performed on the obtained electronic device sheet element under the same evaluation conditions as in Example 1. As a result, conforming items were obtained at 82% (82/100 pcs) after 600 hours.

Example 8

An electronic device sheet element was manufactured by the same manufacturing method as in Example 6 except that the number of projecting portions was 70, and the number of recessed portions was 70, in an insulation patch member. The measurement of the capacitance values and the insulation resistance values and the evaluation of aged deterioration were performed on the obtained electronic device sheet element under the same evaluation conditions as in Example 1. As a result, conforming items were obtained at 85% (85/100 pcs) after 600 hours.

Example 9

An electronic device sheet element was manufactured by the same manufacturing method as in Example 6 except that the number of projecting portions was 100, and the number of recessed portions was 100, in an insulation patch member. The measurement of the capacitance values and the insulation resistance values and the evaluation of aged deterioration were performed on the obtained electronic device sheet element under the same evaluation conditions as in Example 1. As a result, conforming items were obtained at 85% (85/100 pcs) after 600 hours.

Example 10

An electronic device sheet element was manufactured by the same manufacturing method as in Example 6 except that the number of projecting portions was 120, and the number of recessed portions was 120, in an insulation patch member. The measurement of the capacitance values and the insulation resistance values and the evaluation of aged deterioration were performed on the obtained electronic device sheet element under the same evaluation conditions as in Example 1. As a result, conforming items were obtained at 77% (77/100 pcs) after 600 hours.

Example 11

An electronic device sheet element was manufactured by the same manufacturing method as in Example 6 except that the number of projecting portions was 120, and the number of recessed portions was 120, in an insulation patch member. The measurement of the capacitance values and the insulation resistance values and the evaluation of aged deterioration were performed on the obtained electronic device sheet element under the same evaluation conditions as in Example 1. As a result, conforming items were obtained at 76% (76/100 pcs) after 600 hours.

Example 12

An electronic device sheet element was manufactured by the same manufacturing method as in Example 6 except that L/r and S/r of the insulation patch members was set at 1.05 and 0.95, respectively, and no nucleus portion was formed. The measurement of the capacitance values and the insulation resistance values and the evaluation of aged deterioration were performed on the obtained electronic device sheet element under the same evaluation conditions as in Example 1. As a result, conforming items were obtained at 72% (72/100 pcs) after 600 hours.

Example 13

An electronic device sheet element was manufactured by the same manufacturing method as in Example 12 except that L/r and S/r of the insulation patch members was set at 1.37 and 0.62, respectively. The measurement of the capacitance values and the insulation resistance values and the evaluation of aged deterioration were performed on the obtained electronic device sheet element under the same evaluation conditions as in Example 1. As a result, conforming items were obtained at 71% (71/100 pcs) after 600 hours.

Example 14

An electronic device sheet element was manufactured by the same manufacturing method as in Example 12 except that L/r and S/r of the insulation patch members was set at 1.5 and 0.65, respectively. The measurement of the capacitance values and the insulation resistance values and the evaluation of aged deterioration were performed on the obtained electronic device sheet element under the same evaluation conditions as in Example 1. As a result, conforming items were obtained at 65% (65/100 pcs) after 600 hours.

Example 15

An electronic device sheet element was manufactured by the same manufacturing method as in Example 12 except that L/r and S/r of the insulation patch members was set at 1.01 and 0.97, respectively. The measurement of the capacitance values and the insulation resistance values and the evaluation of aged deterioration were performed on the obtained electronic device sheet element under the same evaluation conditions as in Example 1. As a result, conforming items were obtained at 67% (671100 pcs) after 600 hours.

Example 16

An electronic device sheet element was manufactured by the same manufacturing method as in Example 12 except that L/r and S/r of the insulation patch members was set at 1.3 and 0.55, respectively. The measurement of the capacitance values and the insulation resistance values and the evaluation of aged deterioration were performed on the obtained electronic device sheet element under the same evaluation conditions as in Example 1. As a result, conforming items were obtained at 63% (63/100 pcs) after 600 hours.

Example 17

An electronic device sheet element was manufactured by the same manufacturing method as in Example 12 except that the number of projecting portions and recessed portions in each insulation patch member was set at three, respectively, and L/r and S/r of the insulation patch members was set at 1.03 and 0.99, respectively. The measurement of the capacitance values and the insulation resistance values and the evaluation of aged deterioration were performed on the obtained electronic device sheet element under the same evaluation conditions as in Example 1. As a result, conforming items were obtained at 62% (62/100 pcs) after 600 hours.

Comparative Example 1

An electronic device sheet element was manufactured by the same manufacturing method as in Example 12 except that no nucleus portion was formed on the dielectric layer, and no projecting portions nor recessed portions were formed in insulation patch members (i.e., the boundary line had a round shape). The measurement of the capacitance values and the insulation resistance values and the evaluation of aged deterioration were performed on the obtained electronic device sheet element under the same evaluation conditions as in Example 12. As a result, conforming items was obtained only at 3% (3/100 pcs). This is considered due to the absent of projecting portions and recessed portions on the boundary line of each insulation patch member, dielectric breakdown frequently occurred.

Comparative Example 2

An electronic device sheet element was manufactured by the same manufacturing method as in Example 1 except that no insulation patch member was formed, and no nucleus portion was formed. The measurement of the capacitance values and the insulation resistance values and the evaluation of aged deterioration were performed on the obtained electronic device sheet element under the same evaluation conditions as in Example 12. As a result, conforming items was obtained only at 1% (1/100 pcs). This is considered due to the absent of insulation patch members, dielectric breakdown frequently occurred.

TABLE 1

| | CONDITION | | | | | | RESULT | | |
| --- | --- | --- | --- | --- | --- | --- | --- | --- | --- |
| | FORMING METHOD OF INSULATION PATCH MEMBERS | MATERIAL | NUCLEUS PORTION | NUMBER OF PROJECTING PORTIONS | NUMBER OF RECESSED PORTIONS | CLOSEST DISTANCE | L/r | S/r | CONFORMING ITEM RATE (600 hrs) |
| EXAMPLE 1 | INKJET | ALUMINA | PRESENT | 20 | 20 | 150 μm | 1.1 | 0.9 | 91/100 pcs |
| EXAMPLE 2 | INKJET | ALUMINA | PRESENT | 20 | 20 | 500 μm | 1.1 | 0.9 | 94/100 pcs |
| EXAMPLE 3 | INKJET | ALUMINA | PRESENT | 20 | 20 | 800 μm | 1.1 | 0.9 | 95/100 pcs |
| EXAMPLE 4 | INKJET | ALUMINA | PRESENT | 20 | 20 | 1 mm | 1.1 | 0.9 | 92/100 pcs |
| EXAMPLE 5 | INKJET | ALUMINA | PRESENT | 20 | 20 | 4 mm | 1.1 | 0.9 | 98/100 pcs |
| EXAMPLE 6 | PHOTOPATTERNING | EPOXY RESIN | PRESENT | 10 | 10 | 6 mm | 1.1 | 0.9 | 87/100 pcs |
| EXAMPLE 7 | PHOTOPATTERNING | EPOXY RESIN | PRESENT | 30 | 30 | 6 mm | 1.1 | 0.9 | 82/100 pcs |
| EXAMPLE 8 | PHOTOPATTERNING | EPOXY RESIN | PRESENT | 70 | 70 | 6 mm | 1.1 | 0.9 | 85/100 pcs |
| EXAMPLE 9 | PHOTOPATTERNING | EPOXY RESIN | PRESENT | 100 | 100 | 6 mm | 1.1 | 0.9 | 81/100 pcs |
| EXAMPLE 10 | PHOTOPATTERNING | EPOXY RESIN | PRESENT | 120 | 120 | 6 mm | 1.1 | 0.9 | 77/100 pcs |
| EXAMPLE 11 | PHOTOPATTERNING | EPOXY RESIN | PRESENT | 120 | 120 | 6 mm | 1.1 | 0.9 | 76/100 pcs |
| EXAMPLE 12 | PHOTOPATTERNING | EPOXY RESIN | ABSENT | 120 | 120 | 6 mm | 1.05 | 0.95 | 72/100 pcs |
| EXAMPLE 13 | PHOTOPATTERNING | EPOXY RESIN | ABSENT | 120 | 120 | 6 mm | 1.37 | 0.62 | 71/100 pcs |
| EXAMPLE 14 | PHOTOPATTERNING | EPOXY RESIN | ABSENT | 120 | 120 | 6 mm | 1.5 | 0.65 | 65/100 pcs |
| EXAMPLE 15 | PHOTOPATTERNING | EPOXY RESIN | ABSENT | 120 | 120 | 6 mm | 1.01 | 0.97 | 67/100 pcs |
| EXAMPLE 16 | PHOTOPATTERNING | EPOXY RESIN | ABSENT | 120 | 120 | 80 μm | 1.3 | 0.55 | 63/100 pcs |
| EXAMPLE 17 | PHOTOPATTERNING | EPOXY RESIN | ABSENT | 3 | 3 | 6 mm | 1.03 | 0.99 | 62/100 pcs |
| COMPARATIVE EXAMPLE 1 | PHOTOPATTERNING | EPOXY RESIN | ABSENT | 0 | 0 | 6 mm | — | — | 3/100 pcs |
| COMPARATIVE EXAMPLE 2 | NO INSULATION PATCHES | — | ABSENT | — | — | — | — | — | 1/100 pcs |

Through the Examples and the Comparative Examples, the present inventors confirmed that the electronic device sheet in the present embodiment has a good withstanding voltage performance.

What is claimed is:

1. An electronic device sheet, comprising a pair of electrodes, a dielectric layer provided between the pair of electrodes, and one or more insulation patch members provided on one of principal surfaces of the dielectric layer, wherein
    the one or more insulation patch members include a boundary line having an undulating shape,
    projecting portions of the boundary line include regions residing outside an imaginary circle that is centered on a center of gravity of the one or more insulation patch members and that has a same area as the one or more insulation patch members,
    recessed portions of the boundary line include regions residing inside the imaginary circle,
    a ratio L/r between a radius r of the imaginary circle and a maximum distance L of distances from the center of the imaginary circle to the projecting portions is 1.02 to 1.4, and
    a ratio S/r between the radius r of the imaginary circle and a minimum distance S of distances from the center of the imaginary circle to the recessed portions is 0.6 to 0.98.

2. The electronic device sheet according to claim 1, wherein the dielectric layer includes a nucleus portion, and the nucleus portion is covered with the one or more insulation patch members.

3. The electronic device sheet according to claim 1, wherein the one or more insulation patch members includes 2 to 120 of the projecting portions and 2 to 120 of the recessed portions.

4. The electronic device sheet according to claim 1, wherein the principal surface includes thereon two or more of the insulation patch members, and a closest distance between the two or more insulation patch members is 100 μm to 5 mm.

5. An electronic device sheet, comprising a pair of electrodes, a dielectric layer provided between the pair of electrodes, and two or more insulation patch members provided on one of principal surfaces of the dielectric layer, wherein the two or more insulation patch members include a boundary line having an undulating shape, and a closest distance between the two or more insulation patch members is 100 μm to 5 mm.

6. The electronic device sheet according to claim 5, wherein the dielectric layer includes a nucleus portion, and the nucleus portion is covered with the two or more insulation patch members.

7. The electronic device sheet according to claim 5, wherein the two or more insulation patch members include 2 to 120 of the projecting portions 2 to 120 of the recessed portions.

\* \* \* \* \*